(12) United States Patent
Yacoub

(10) Patent No.: US 9,551,302 B2
(45) Date of Patent: Jan. 24, 2017

(54) CONTROLLING FRESH AIR AND EXHAUST GAS FLOW IN TURBOCHARGED INTERNAL COMBUSTION ENGINE

(71) Applicant: FORD GLOBAL TECHNOLOGIES, LLC, Dearborn, MI (US)

(72) Inventor: Yasser Mohamed Sayed Yacoub, Köln (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 986 days.

(21) Appl. No.: 13/732,586

(22) Filed: Jan. 2, 2013

(65) Prior Publication Data

US 2013/0174546 A1    Jul. 11, 2013

(30) Foreign Application Priority Data

Jan. 5, 2012    (DE) .......................... 10 2012 200 111

(51) Int. Cl.
*F02B 47/08*        (2006.01)
*F02D 21/08*        (2006.01)
(Continued)

(52) U.S. Cl.
CPC ............ *F02M 25/07* (2013.01); *F02B 37/168* (2013.01); *F02B 47/08* (2013.01); *F02D 21/08* (2013.01);
(Continued)

(58) Field of Classification Search
CPC ....... F02B 47/08; F02B 37/168; F02B 37/183; F02M 25/07; F02M 25/0707; F02M 25/0726; F02M 25/0728; F02D 21/08; F02D 41/068; F02D 41/0055; Y02T 10/144
(Continued)

(56) References Cited

U.S. PATENT DOCUMENTS 4,404,805 A * 9/1983 Curtil ...................... F02B 37/10
                                                123/41.41
6,470,864 B2 * 10/2002 Kim ...................... F02B 37/005
                                                123/568.12
(Continued)

FOREIGN PATENT DOCUMENTS

JP            2005098278 A      4/2005

*Primary Examiner* — Nicholas J Weiss
*Assistant Examiner* — Paul Thiede
(74) *Attorney, Agent, or Firm* — Gregory P. Brown; MacMillan, Sobanski & Todd, LLC

(57) ABSTRACT

An internal combustion engine has a cylinder and an exhaust-gas turbocharger comprising a compressor arranged in an intake system and a turbine arranged in an exhaust-gas discharge system. Various lines are provided for conducting gases including 1) a bypass line branching off from the inlet system downstream of the compressor so as to form an inlet-side junction, and 2) a recirculation line branching off from the exhaust-gas discharge system upstream of the turbine so as to form an outlet-side junction which opens into the bypass line. A first control element at the outlet-side junction adjusts an exhaust-gas quantity conducted through the recirculation line. A second control element at the inlet-side junction has a first position that separates the bypass line from the cylinder and connects the intake line to the cylinder, and a second position that separates the intake line from the cylinder and connects the bypass line to the cylinder.

6 Claims, 10 Drawing Sheets

(51) Int. Cl.
  *F02D 41/06* (2006.01)
  *F02B 37/16* (2006.01)
  *F02B 37/18* (2006.01)
  *F02M 25/07* (2006.01)
  *F02D 41/00* (2006.01)

(52) U.S. Cl.
  CPC .......... *F02B 37/183* (2013.01); *F02D 41/0055* (2013.01); *F02D 41/068* (2013.01); *F02M 26/05* (2016.02); *F02M 26/22* (2016.02); *Y02T 10/144* (2013.01)

(58) Field of Classification Search
  USPC .......................................... 60/605.2; 701/108
  See application file for complete search history.

(56) References Cited

U.S. PATENT DOCUMENTS

| | | | |
|---|---|---|---|
| 7,454,896 B2 | 11/2008 | Chalgren et al. | |
| 7,934,486 B1 | 5/2011 | Styles et al. | |
| 8,001,780 B2* | 8/2011 | Onodera | F02B 37/025 123/568.11 |
| 2001/0020363 A1 | 9/2001 | Strahle et al. | |
| 2008/0028748 A1* | 2/2008 | Huang | F01N 3/031 60/282 |
| 2010/0186727 A1* | 7/2010 | Kaneko | F02D 21/08 123/568.21 |
| 2011/0100341 A1* | 5/2011 | Yacoub | F02B 37/00 123/568.11 |
| 2011/0138774 A1* | 6/2011 | Pursifull | F01N 3/055 60/273 |
| 2011/0160984 A1* | 6/2011 | Inoue | F02D 41/0052 701/108 |
| 2012/0023935 A1* | 2/2012 | Pursifull | F02D 13/0207 60/605.2 |
| 2013/0081391 A1* | 4/2013 | Vijayaraghavan | F02B 37/168 60/602 |

\* cited by examiner

CONTROLLING FRESH AIR AND EXHAUST GAS FLOW IN TURBOCHARGED INTERNAL COMBUSTION ENGINE

STATEMENT REGARDING FEDERALLY SPONSORED RESEARCH

Not Applicable.

CROSS REFERENCE TO RELATED APPLICATIONS

This application claims priority to application 102012200111.5, filed in the German Patent and Trademark Office on Jan. 5, 2012, which is hereby incorporated by reference.

BACKGROUND OF THE INVENTION

The invention relates to an internal combustion engine having at least one cylinder, at the outlet side at least one exhaust line for discharging the exhaust gases via an exhaust-gas discharge system, and at the inlet side at least one intake line for supplying charge air via an intake system, which internal combustion engine is equipped with
- at least one exhaust-gas turbocharger comprising a compressor arranged in the intake system and a turbine arranged in the exhaust-gas discharge system,
- a bypass line for bypassing the at least one cylinder, which bypass line branches off from the intake system downstream of the compressor so as to form an inlet-side junction and opens into the exhaust-gas discharge system downstream of the turbine, and
- at least one exhaust-gas recirculation arrangement which comprises a recirculation line which branches off from the exhaust-gas discharge system upstream of the turbine so as to form an outlet-side junction and which opens into the bypass line.

Within the context of the present invention, the at least one exhaust line is to be regarded as belonging to the exhaust-gas discharge system, and the at least one intake line is to be regarded as belonging to the intake system.

The invention also relates to a method for operating an internal combustion engine of the stated type which has a liquid-type cooling arrangement, in which a cooling device which is operated with coolant and which is connected to the liquid-type cooling arrangement of the internal combustion engine is provided in the recirculation line of the at least one exhaust-gas recirculation arrangement.

Within the context of the present invention, the expression "internal combustion engine" encompasses diesel engines and spark-ignition engines and also hybrid internal combustion engines which operate with a hybrid combustion process.

In the development of internal combustion engines, it is basically sought to minimize fuel consumption and reduce pollutant emissions. In the prior art, various measures are implemented to achieve said aims. With regard to the pollutant problem, the reduction of nitrogen oxide emissions is of high relevance, in particular in the case of diesel engines. Since the formation of nitrogen oxides requires not only an excess of air but rather also high temperatures, one concept for reducing the nitrogen oxide emissions consists in reducing the combustion temperatures. Here, exhaust-gas recirculation, that is to say the recirculation of exhaust gas from the exhaust-gas discharge system into the intake system, is expedient in achieving this aim, wherein it is possible for the nitrogen oxide emissions to be considerably reduced with increasing exhaust-gas recirculation rate. The exhaust-gas recirculation rate $x_{EGR}$ is determined as follows:

$$x_{EGR} = m_{EGR}/(m_{EGR} + m_{Fresh\ air})$$

where $m_{EGR}$ denotes the mass of recirculated exhaust gas and $m_{Fresh\ air}$ denotes the fresh air which is supplied, having previously been compressed by means of a compressor, to the at least one cylinder. Within the context of the present invention, therefore, the charge air may also comprise recirculated exhaust gas aside from the fresh air.

To obtain a considerable reduction in nitrogen oxide emissions, high exhaust-gas recirculation rates are required which may be of the order of magnitude of $x_{EGR} \approx 60\%$ to 70%. According to the prior art, to adjust the exhaust-gas quantity to be recirculated (i.e., the recirculation rate), a control element, also referred to as an EGR valve, is provided in the recirculation line. Exhaust-gas recirculation (EGR) may also be utilized for reducing the emissions of unburned hydrocarbons.

The exhaust-gas recirculation arrangement provided is a so-called high-pressure EGR arrangement in which the exhaust gas is extracted from the exhaust-gas discharge system upstream of the turbine and is introduced into the intake system, or into a bypass line which is or can be connected to the intake system, downstream of the compressor.

The internal combustion engine to which the preferred embodiment of present invention relates is equipped not only with at least one exhaust-gas recirculation arrangement but rather also with at least one exhaust-gas turbocharger which comprises a compressor arranged in the intake system and a turbine arranged in the exhaust-gas discharge system. During the operation of an internal combustion engine with exhaust-gas turbocharging and with the simultaneous use of a high-pressure EGR arrangement, there is a basic conflict which consists in that the exhaust gas extracted upstream of the turbine for the purpose of recirculation is by definition not conducted through the turbine, and is thus not available for generating a charge pressure on the inlet side. In the event of an increase in the exhaust-gas recirculation rate, the exhaust-gas flow introduced into the turbine simultaneously decreases. The reduced exhaust-gas mass flow through the turbine leads to a lower turbine pressure ratio, as a result of which the charge pressure ratio also falls, which equates to a smaller compressor mass flow. Aside from the decreasing charge pressure, additional problems may arise in the operation of the compressor with regard to the surge limit of the compressor.

The exhaust-gas quantity conducted through the recirculation line of the EGR arrangement and the exhaust-gas quantity conducted through the turbine are only two examples of fluid flows which, during the operation of an internal combustion engine, must be measured and adjusted by means of control elements.

The turbine of an exhaust-gas turbocharger is often designed as a wastegate turbine with a small turbine cross section, in order to improve the torque characteristic of the internal combustion engine at low rotational speeds. If the exhaust-gas mass flow exceeds a critical value, then, by opening a control element, a part of the exhaust-gas flow is, within the course of the so-called exhaust-gas blow-off, conducted via a bypass line past the turbine or the turbine impeller. The blown-off exhaust gas is another example of a fluid flow which must be adjusted and controlled by means of a control element.

Further examples of fluid flows which must be adjusted, that is to say controlled, arise if the internal combustion engine is equipped with a secondary air injection facility or a liquid-type cooling arrangement in which the cylinder head or cylinder block is provided with coolant-conducting ducts. Since it is not the aim and the purpose of a liquid-type cooling arrangement to extract the greatest possible amount of heat from the internal combustion engine under all operating conditions, it is sought, by means of control elements, to implement control of the coolant flows and thus of the liquid-type cooling arrangement according to demand, which control also makes allowance for the operating modes of the internal combustion engine in which it is more advantageous to extract less heat or as little heat as possible from the internal combustion engine, and if appropriate to introduce heat into the internal combustion engine.

The above statements make it clear that a multiplicity of fluid flows must be adjusted and controlled by means of control elements during the operation of an internal combustion engine. For this reason, concepts are required which arrange the fluid-conducting lines in an advantageous manner and which keep the number of control elements required as low as possible.

SUMMARY OF THE INVENTION

Against the background of that stated above, it is an object of the present invention to provide an internal combustion engine according to the preamble of claim 1, which is optimized in relation to the prior art with regard to the guidance and control of the fluid flows.

It is a further sub-object of the present invention to specify a method for operating an internal combustion engine of said type.

The first sub-object is achieved by means of an internal combustion engine having at least one cylinder, at the outlet side at least one exhaust line for discharging the exhaust gases via an exhaust-gas discharge system, and at the inlet side at least one intake line for supplying charge air via an intake system, which internal combustion engine is equipped with at least one exhaust-gas turbocharger comprising a compressor arranged in the intake system and a turbine arranged in the exhaust-gas discharge system, a bypass line for bypassing the at least one cylinder, which bypass line branches off from the inlet system downstream of the compressor so as to form an inlet-side junction and opens into the exhaust-gas discharge system downstream of the turbine, and at least one exhaust-gas recirculation arrangement which comprises a recirculation line which branches off from the exhaust-gas discharge system upstream of the turbine so as to form an outlet-side junction and which opens into the bypass line, and wherein at the outlet side, there is arranged a first control element which serves for adjusting the exhaust-gas quantity conducted through the recirculation line, and at the inlet side, there is arranged at least one second control element which, in a first position, separates the bypass line from the at least one cylinder and connects the at least one intake line to the at least one cylinder, and, in a second position, separates the at least one intake line from the at least one cylinder and connects the bypass line to the at least one cylinder.

The internal combustion engine according to the invention has at least two control elements, of which a first control element is arranged at the outlet side and a second control element is arranged at the inlet side. The first control element serves for adjusting the exhaust-gas quantity conducted through the recirculation line and thus simultaneously for adjusting the exhaust-gas quantity conducted through the turbine. Since the internal combustion engine is equipped with a bypass line of the described type and the recirculation line of the exhaust-gas recirculation arrangement opens into said bypass line, the recirculation line can also serve or be used, in interaction with the bypass line, as a blow-off line for the turbine.

A movement of the second control element into the first position separates the bypass line from the at least one cylinder of the internal combustion engine. Through actuation (i.e., adjustment) of the first control element, it is determined whether all of the exhaust gas is conducted through the turbine or a part of the exhaust gas is blown off via the recirculation line and bypass line and conducted into the exhaust-gas discharge system downstream of the turbine.

In said first position, the second control element simultaneously connects the at least one intake line to the at least one cylinder, such that all of the fresh air conducted through the compressor and no exhaust gases are supplied as charge air to the at least one cylinder via the intake line.

The second control element arranged at the inlet side may furthermore be adjusted such that the at least one intake line and the bypass line are connected to one another and to the at least one cylinder. In said position, it is possible either for exhaust gas to be conducted back into the at least one cylinder, such that the charge air comprises not only fresh air but also exhaust gas, or for fresh air to be injected into the exhaust-gas discharge system via the bypass line. In the latter case, the bypass line serves for the so-called secondary air injection.

Finally, the second control element may be moved into a second position, in which the at least one intake line is separated from the at least one cylinder and the bypass line is connected to the at least one cylinder. In said position, only exhaust gas and no fresh air is introduced into the at least one cylinder of the internal combustion engine. The second position furthermore makes it possible, with the intake line closed, for all of the exhaust gas to be conducted through the turbine and, subsequently, for a part of the exhaust gas to be recirculated into the at least one cylinder via the bypass line.

The fluid-conducting lines of the internal combustion engine according to the invention, in particular the lines which conduct fresh air or charge air and the lines which conduct exhaust gas, are advantageously arranged and connected to one another in such a way that only two control elements are required for the control of the associated fluid flows during the operation of the internal combustion engine. With the internal combustion engine according to the invention, the first problem on which the invention is based is consequently solved, that is to say an internal combustion engine is provided which is optimized with regard to the guidance and control of the fluid flows.

As already described, in the case of supercharged internal combustion engines, a torque drop is often observed toward low exhaust-gas quantities, because the turbine pressure ratio and consequently the charge pressure ratio also decrease with the exhaust-gas mass flow rate. This may be remedied to a certain extent by means of a wastegate turbine with a relatively small turbine cross section. The torque characteristic of a supercharged internal combustion engine may furthermore be improved by virtue of a plurality of turbochargers or turbines being connected in parallel or in series. The associated compressors may be arranged in series or in parallel in the intake system. For this reason, embodiments of the internal combustion engine are also advantageous in particular in which at least two exhaust-gas turbochargers are provided.

Further advantageous embodiments of the internal combustion engine will be discussed in conjunction with the subclaims.

Embodiments of the internal combustion engine are advantageous in which the first control element is arranged at the outlet-side junction. Said arrangement of the control element prevents exhaust gas from being delivered into the recirculation line or in the direction of the turbine when the control element is blocking the recirculation line or the line to the turbine and the exhaust gas specifically should not be conducted into the respective line. If the control element were arranged in the recirculation line or in the bypass line, delivery into the line would take place despite the blocking.

Embodiments of the internal combustion engine are advantageous in which a second control element is arranged at the inlet-side junction, which second control element can be adjusted between the first position and the second position. Said embodiment is characterized in that, at the inlet side, there is provided not a plurality of control elements but rather only a single control element. In the present case, said control element is arranged at the inlet-side junction. With regard to the advantages of the arrangement at the junction instead of the arrangement in a line remote from the junction, reference is made to the statements made in conjunction with the above embodiment.

Certain embodiments of the internal combustion engine are advantageous in which said second control element can be adjusted into at least one third position in which the at least one intake line and the bypass line are connected to one another and to the at least one cylinder. As has already been stated, in said position of the second control element, it is possible for exhaust gas to be admixed to the fresh air supplied to the at least one cylinder; it is however in particular also possible for fresh air to be injected into the exhaust-gas discharge system via the bypass line during the course of a secondary air injection.

Embodiments of the internal combustion engine are advantageous in which a cooling device is provided in the recirculation line of the at least one exhaust-gas recirculation arrangement in order to cool the exhaust gas. A cooling device provided in the recirculation line is expedient for reducing the temperature in the hot exhaust-gas flow and thus increasing the density of the exhaust gases. To a certain extent, compression as a result of cooling takes place. In this way, it is possible to realize the high recirculation rates necessary for lowering the nitrogen oxide emissions.

It is fundamentally possible for the cooling arrangement to be designed, according to the principle of a heat exchanger, in the form of an air cooling arrangement or a liquid-type cooling arrangement. In the case of the air cooling arrangement, the gas flow conducted through the cooler is cooled by means of an air flow which results from the relative wind and/or which is generated by a blower. In contrast, the liquid-type cooling arrangement necessitates the formation of a cooling circuit, if appropriate using an already existing circuit, for example the engine cooling arrangement of a liquid-cooled internal combustion engine. Here, the coolant is fed by means of a pump arranged in the cooling circuit, such that said coolant circulates and flows through the cooler. The heat dissipated from the charge air to the coolant in the cooler is conducted away, and extracted from the coolant again in another heat exchanger or at some other location.

On account of the significantly higher heat capacity of a liquid in relation to air, it is possible for significantly greater heat quantities to be dissipated by means of liquid-type cooling than is possible with air cooling. For this reason, in particular in the case of supercharged internal combustion engines with exhaust-gas recirculation, it is advantageous for a liquid-type cooling arrangement to be used, because the heat quantity to be dissipated may be relatively large. Embodiments of the internal combustion engine are therefore also advantageous in which the cooling device of the exhaust-gas recirculation arrangement is a cooling device which is operated with coolant.

Certain embodiments of the internal combustion engine are advantageous in which the internal combustion engine is equipped with a liquid-type cooling arrangement because a supercharged internal combustion engine with exhaust-gas recirculation is thermally particularly highly loaded and places increased demands on the cooling arrangement. In the case of liquid-cooled internal combustion engines in which the cooling device of the exhaust-gas recirculation arrangement is a cooling device which is operated with coolant, embodiments of the internal combustion engine are advantageous in which said cooling device is connected to the liquid-type cooling arrangement of the internal combustion engine. Said embodiment of the internal combustion engine makes it possible—for example during the warm-up phase or after a cold start—to introduce heat from the hot exhaust-gas flow into the coolant, and in this way to assist, that is to say accelerate, the heating-up process of the internal combustion engine, using the cooling device which is operated with coolant.

To reduce the friction losses and thus the fuel consumption of an internal combustion engine, fast heating of the engine oil is sought. Fast heating of the engine oil during the warm-up phase of the internal combustion engine ensures a correspondingly fast decrease in the viscosity of the oil and thus a reduction in friction and friction losses, in particular in the bearings which are supplied with oil, for example the bearings of the crankshaft. Fast heating of the engine oil in order to reduce friction losses may basically be abetted by means of fast heating of the internal combustion engine itself, which in turn is assisted, that is to say forced, by virtue of as little heat as possible being extracted from the internal combustion engine during the warm-up phase by means of the coolant, or by virtue of heat being additionally introduced into the internal combustion engine using the hot exhaust gas.

The connection of the cooling device which is operated with coolant to the liquid-type cooling arrangement of the internal combustion engine makes it possible for both cooling arrangements to jointly utilize certain components, for example a pump for delivering the coolant. The number of components is thereby reduced, which is advantageous with regard to the weight of the drive unit and assists dense packaging in the engine bay.

Certain embodiments of the internal combustion engine are advantageous in which at least one exhaust-gas aftertreatment system is provided in the exhaust-gas discharge system downstream of the turbine of the at least one exhaust-gas turbocharger. To reduce the pollutant emissions, it is advantageous for the exhaust gas of the internal combustion engine to undergo exhaust-gas aftertreatment. For this purpose, use may if required be made of particle filters, storage catalytic converters, oxidation catalytic converters, three-way catalytic converters or SCR catalytic converters, also in combination.

Embodiments of the internal combustion engine are advantageous in which the first control element and/or the second control element are formed as a flap which is pivotable about an axis. The control elements may also be in the form of valves, in particular 3-3 directional control valves with three ports and three switching positions. Embodiments are advantageous in which the control elements can be electrically, hydraulically, pneumatically, mechanically or magnetically controlled, preferably by means of an engine controller. The control elements may be capable of two-stage or multi-stage switching or may be continuously adjustable.

The present invention includes a method for operating a liquid-cooled internal combustion engine of an above-stated type, in which a cooling device which is operated with coolant and is connected to the liquid-type cooling arrangement of the internal combustion engine provided in the recirculation line of the at least one exhaust-gas recirculation arrangement, at the outlet-side junction there is arranged a first control element which serves for adjusting the exhaust-gas quantity conducted through the recirculation line, and at the inlet-side junction there is arranged a second control element which can be moved into at least three positions, wherein in the third position the at least one intake line and the bypass line are connected to one another and to the at least one cylinder, and wherein the control elements are adjusted as a function of the operation of the internal combustion engine so as to conduct the exhaust gas and the charge air through the intake system and the exhaust-gas discharge system according to demand.

That which has been stated in connection with the internal combustion engine according to the invention likewise applies to the method according to the invention. Reference is made in particular to the method features which have been discussed during the description of the internal combustion engine, and the actuation or adjustment of the control elements and their positions.

There are three variations for the setting or adjustment of the second control element, each of which may be combined with the three variants or positions of the first control element. In a first variation, the second control element is advantageously moved into the first position such that all of the fresh air conducted through the compressor and no exhaust gases are supplied as charge air to the at least one cylinder via the intake line. In said position of the second control element, no exhaust gas is recirculated into the at least one cylinder. Through suitable adjustment of the first control element, it is then possible for different operating modes to be realized or advantageously assisted. For example, the recirculation line may be blocked, such that all of the exhaust gas is conducted through the turbine and is available and utilized for generating as high as possible a charge pressure on the inlet side. This is advantageous in particular at high loads or full load, that is to say for realizing a high torque.

The first control element may also be adjusted such that a part of the exhaust gas is conducted through the recirculation line and the remaining part of the exhaust gas is conducted through the turbine. Since the second control element prevents a recirculation of exhaust gas when in the first position, in this case, the at least partially opened-up recirculation line functions, together with the bypass line, as a blow-off line via which exhaust gas is conducted past the turbine. The blow-off of exhaust gas leads to a reduction of the charge pressure on the inlet side, and thus to a decrease of the air mass introduced into the cylinder, and consequently to a decrease in power. Said measure, which can be carried out within the context of so-called de-rating, reduces the thermal loading of the internal combustion engine by reducing the power or the mean pressure. In said operating state, it is additionally the case that the blown-off exhaust gas is cooled in the cooling device, as a result of which the thermal loading of exhaust-gas aftertreatment systems provided in the exhaust-gas discharge system can be reduced. The blown-off exhaust gas may furthermore be utilized, after a cold start or in the warm-up phase, to introduce heat into the liquid-type cooling arrangement of the internal combustion engine, and thus into the internal combustion engine itself, by means of the cooling device which is operated with coolant. This advantageously assists the heating-up process of the internal combustion engine, as a result of which both the friction losses and also the emissions, in particular of unburned hydrocarbons, are noticeably reduced.

Said heating-up process can be further accelerated by virtue of the first control element being adjusted such that no exhaust gas whatsoever is conducted through the turbine, but rather all of the exhaust gas is conducted through the recirculation line. The amount of heat introduced into the internal combustion engine is thus increased or maximized, wherein the internal combustion engine operates as a naturally aspirated engine as a result of the deactivation of the exhaust-gas turbocharger.

In a second variation of the invention, the second control element is advantageously moved into the third position in which the at least one intake line and the bypass line are connected to one another and to the at least one cylinder. In said position of the second control element, it is possible, through corresponding adjustment of the first control element, for exhaust gas to be conducted back into the at least one cylinder, such that the charge air comprises not only fresh air but also recirculated exhaust gas. This is advantageous for reducing the nitrogen oxide emissions, in particular when the internal combustion engine has already been heated up or is hot. Here, the first control element may be adjusted in such a way that a part of the exhaust gas or all of the exhaust gas is conducted through the recirculation line. The latter is particularly advantageous for reducing the exhaust-gas back pressure and thus for improving efficiency at part load. If all of the exhaust gas is conducted through the turbine, it is possible during the course of a secondary air injection for fresh air to be injected into the exhaust-gas discharge system via a bypass line. All of the exhaust gas serves, at the inlet side, for generating the charge pressure, which also serves for delivering the secondary air and which thus significantly co-determines the secondary air quantity injected into the exhaust-gas discharge system. Exhaust-gas aftertreatment systems arranged in the exhaust-gas discharge system can be cooled by means of a secondary air injection. Furthermore, the secondary air injection constitutes a possible measure within the context of de-rating for reducing the thermal loading of the internal combustion engine by reducing the air quantity supplied to the cylinders.

In the third variation, the second control element is advantageously moved into the second position such that only recirculated exhaust gases and no fresh air conducted through the compressor are supplied as charge air to the at least one cylinder via the intake line. Regardless of the position of the first control element, the introduction of fresh air into the cylinder is prevented, which may be expedient for example during overrun operation. By contrast, the manner in which exhaust gas is recirculated, and the quantities of exhaust gas recirculated, are dependent on the position of the first control element. The first control element may be adjusted in such a way that a part of the exhaust gas or all of the exhaust gas is conducted through the recirculation line. A part of the exhaust gas conducted through the recirculation line is then supplied via an intake line to the at least one cylinder, and a part of the exhaust gas is fed via a bypass line, bypassing the turbine, into the exhaust-gas discharge system. This offers advantages for example in overrun operation of the internal combustion engine, in which the supply of fuel is preferably interrupted. The hot recirculated exhaust gas ensures that the internal combustion engine does not cool down, or cools down to a lesser extent, during overrun operation. This has an advantageous effect on the pollutant emissions, in particular on the emissions of unburned hydrocarbons and carbon monoxide, if the internal combustion engine is switched back to fired operation again subsequently to overrun operation.

The second control element, when in the second position, serves to provide an increased pressure gradient between the exhaust-gas discharge system and the intake system, and therefore a high exhaust-gas recirculation rate during overrun operation. With the intake line blocked, the internal combustion engine sucks in exhaust gas via the bypass line, which increases the pumping losses, that is to say the charge-exchange losses, in the manner of an engine brake.

Variants are also advantageous in which the first control element is adjusted in such a way that all of the exhaust gas is conducted through the turbine. The internal combustion engine then sucks exhaust gas in from the exhaust-gas discharge system via the bypass line. An advantage of said method variant is in particular that all of the exhaust gas of the turbine is provided for generating a high charge pressure on the inlet side. In this way, a fast response of the internal combustion engine is ensured as soon as the second control element is moved from the second position into another position.

That which has been stated for the overrun operation of the internal combustion engine also applies analogously to a braking mode of the internal combustion engine.

The three described method variants with regard to the first control element are advantageously employed according to the varying needs of the engine (for the reasons stated above). The method variants are advantageous wherein
the first control element is adjusted such that no exhaust gas is conducted through the recirculation line, but rather all of the exhaust gas is conducted through the turbine.

Method variants are also advantageous in which
the first control element is adjusted such that a part of the exhaust gas is conducted through the recirculation line and the remaining part of the exhaust gas is conducted through the turbine.

Method variants are furthermore advantageous in which
the first control element is adjusted such that no exhaust gas is conducted through the turbine, but rather all of the exhaust gas is conducted through the recirculation line.

The present invention operates by monitoring the operating conditions of the internal combustion engine to determine a desired mode of the flows of fresh air and exhaust gases. Then the first and second control elements are adjusted according to the desired mode.

BRIEF DESCRIPTION OF THE DRAWINGS

The invention will be described in more detail below on the basis of an embodiment of the internal combustion engine according to FIGS. 1 to 10, wherein.

DETAILED DESCRIPTION OF PREFERRED EMBODIMENTS

Figure 1:
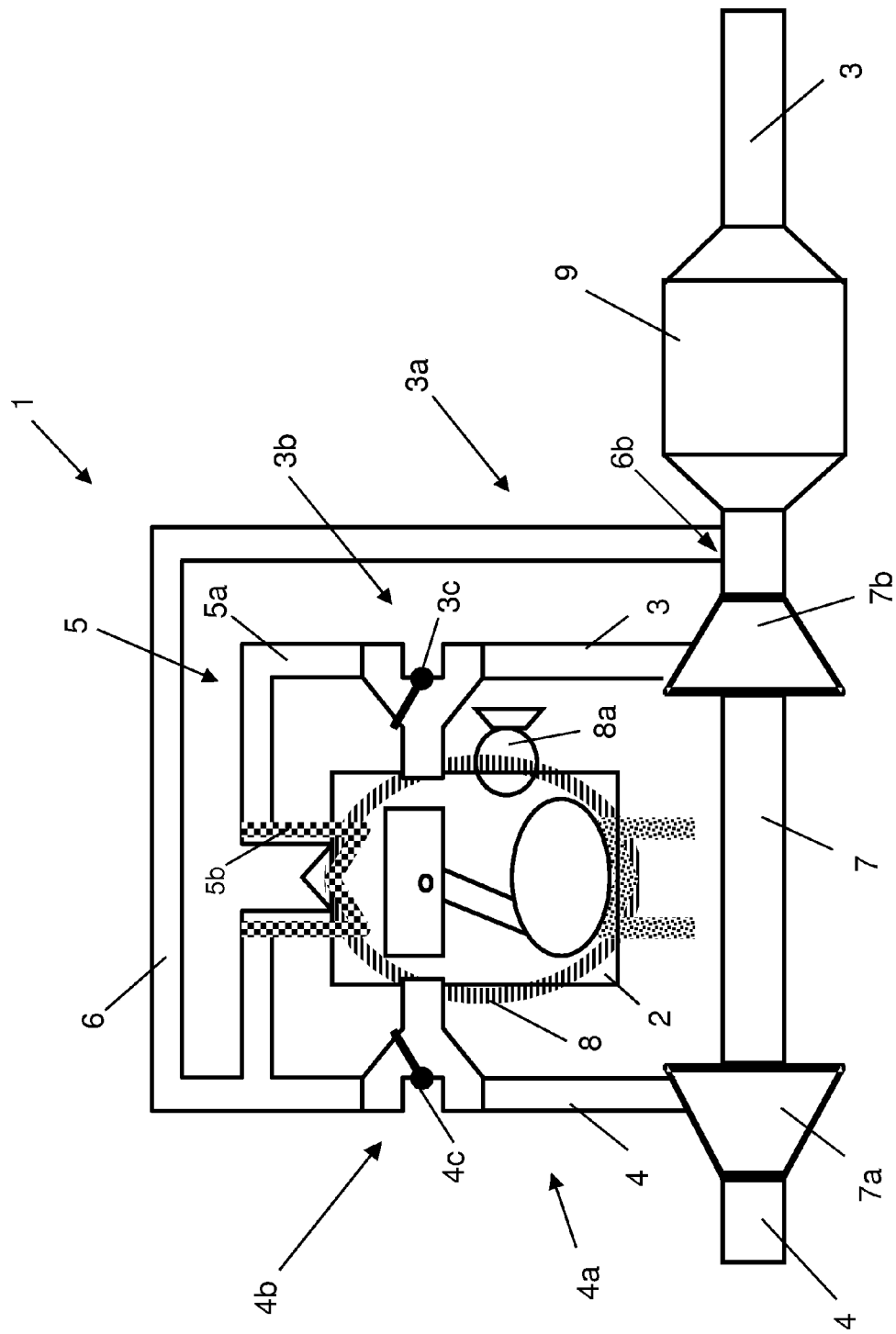
FIG. 1 schematically shows a first embodiment of the internal combustion engine.

FIG. 1 schematically shows a first embodiment of the internal combustion engine 1 and, representatively, one cylinder 2. The fluid flows are not indicated. The internal combustion engine 1 has, at the outlet side, an exhaust line 3 for discharging the exhaust gases via an exhaust-gas discharge system 3a, and, at the inlet side, an intake line 4 for supplying charge air via an intake system 4a.

The internal combustion engine 1 is equipped, for supercharging, with an exhaust-gas turbocharger 7, the compressor 7a of which is arranged in the intake line 4 of the intake system 4a and the turbine 7b of which is arranged in the exhaust line 3 of the exhaust-gas discharge system 3a.

The internal combustion engine 1 is furthermore provided with a bypass line 6 for bypassing the cylinder 2, which bypass line branches off from the intake system 4a downstream of the compressor 7a so as to form an inlet-side junction 4b and opens into the exhaust-gas discharge system 3a again at 6b downstream of the turbine 7b.

The internal combustion engine 1 is furthermore equipped with an exhaust-gas recirculation arrangement 5 which comprises a recirculation line 5a which branches off from the exhaust-gas discharge system 3a upstream of the turbine 7b so as to form an outlet-side junction 3b and which opens into the bypass line 6. The exhaust-gas recirculation arrangement 5 of the internal combustion engine 1 illustrated in FIG. 1 is thus a high-pressure EGR arrangement 5.

A cooling device 5b for cooling the exhaust gas is provided in the recirculation line 5a. In the present case, the cooling device 5b is operated with coolant and forms a joint cooling circuit with the engine cooling arrangement 8, that is to say the liquid-type cooling arrangement 8 of the internal combustion engine 1. The coolant is delivered by means of a pump 8a arranged in the cooling circuit, such that said coolant circulates in the internal combustion engine 1 and likewise flows through the cooling device 5b. The heat which is dissipated to the coolant is extracted from the coolant again in another heat exchanger or radiator if required.

Said design of the cooling circuit also makes it possible, during the warm-up phase or after a cold start, for heat to be introduced from the hot exhaust-gas flow into the coolant, and thereby into the internal combustion engine 1, using the cooling device 5b.

At the outlet-side junction 3b, there is arranged a first control element 3c which serves for adjusting the exhaust-gas quantity conducted through the recirculation line 5a and thus also for adjusting the exhaust-gas quantity conducted through the turbine 7b. At the inlet-side junction 4b, there is arranged a second control element 4c which, in a first position, separates the bypass line 6 from the cylinder 2 and connects the intake line 4 to the cylinder 2 (see also FIGS. 2 to 4). In a second position of the control element 4c, the intake line 4 is separated from the cylinder 2, and the bypass line 6 is connected to the cylinder 2 (see also FIGS. 8 to 10). In a third position of the second control element 4c, the intake line 4 and the bypass line 6 are connected to one another and to the cylinder 2 (see also FIGS. 5 to 7).

An exhaust-gas aftertreatment system 9 is provided in the exhaust-gas discharge system 3a downstream of the turbine 7b of the exhaust-gas turbocharger 7.

FIGS. 2 to 10 show the embodiment of the internal combustion engine 1 illustrated in FIG. 1, with the two control elements 3c, 4c in different switching states (i.e., positions). The fluid flows are indicated, wherein the fresh-air flow is illustrated as a dotted line and the exhaust-gas flow is illustrated as a dashed line. The same reference symbols have been used for the same components.

Figure 2:
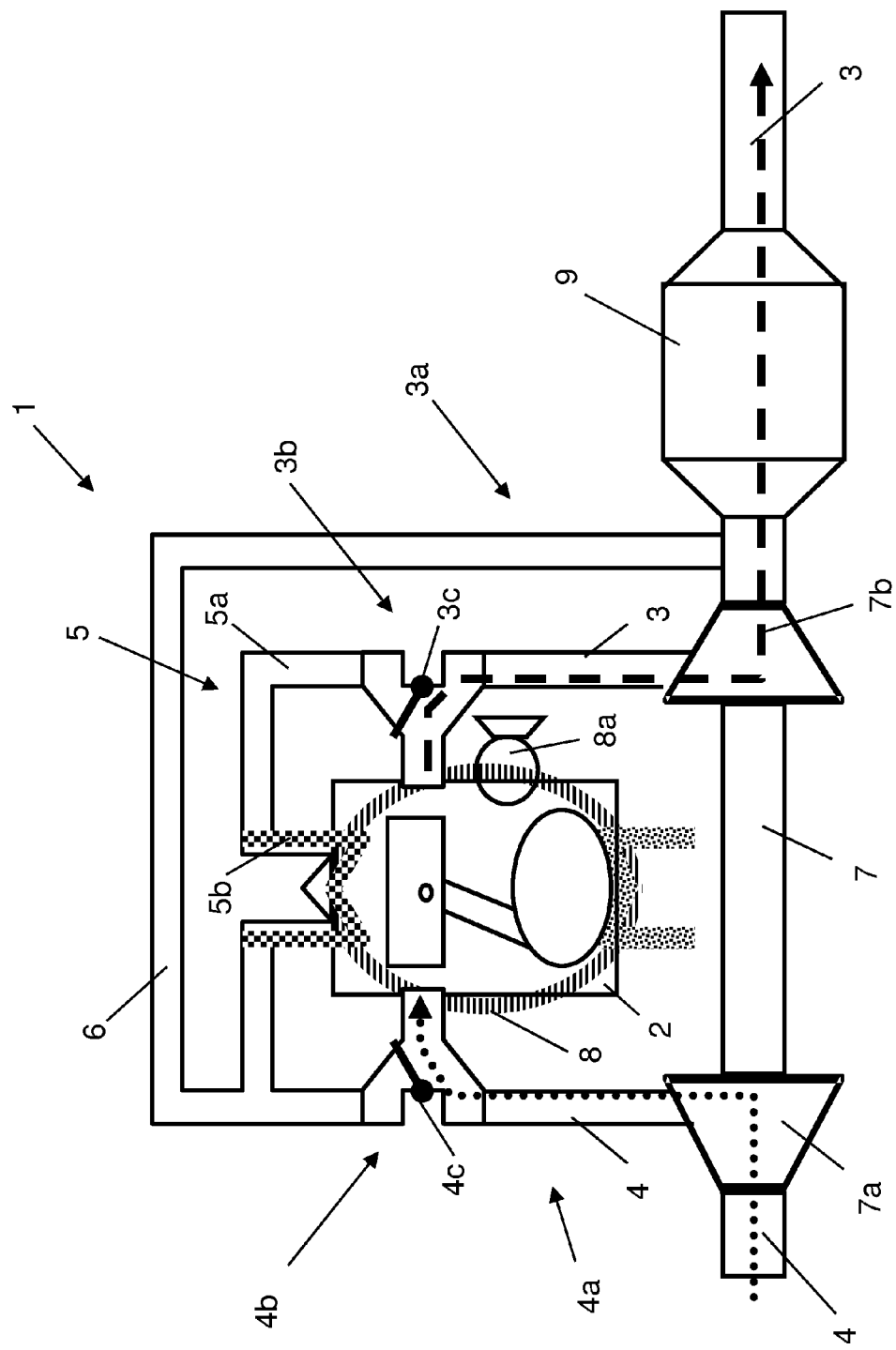
FIG. 2 schematically shows the embodiment of the internal combustion engine illustrated in FIG. 1, with the two control elements in a first switching state.

FIG. 2 schematically shows the embodiment of the internal combustion engine 1 illustrated in FIG. 1, with the two control elements 3c, 4c in a first switching state. The second control element 4c is in the first position, in which the bypass line 6 is separated from the cylinder 2 and the intake line 4 is connected to the cylinder 2. All of the fresh air is conducted through the compressor 7a and no exhaust gases are supplied as charge air to the cylinder 2 via the intake line 4. The first control element 3c is set in such a way that all of the exhaust gas is conducted through the turbine 7b and thus contributes to the charge pressure increase on the inlet side. In this way it is possible to realize high loads or high torques.

Figure 3:
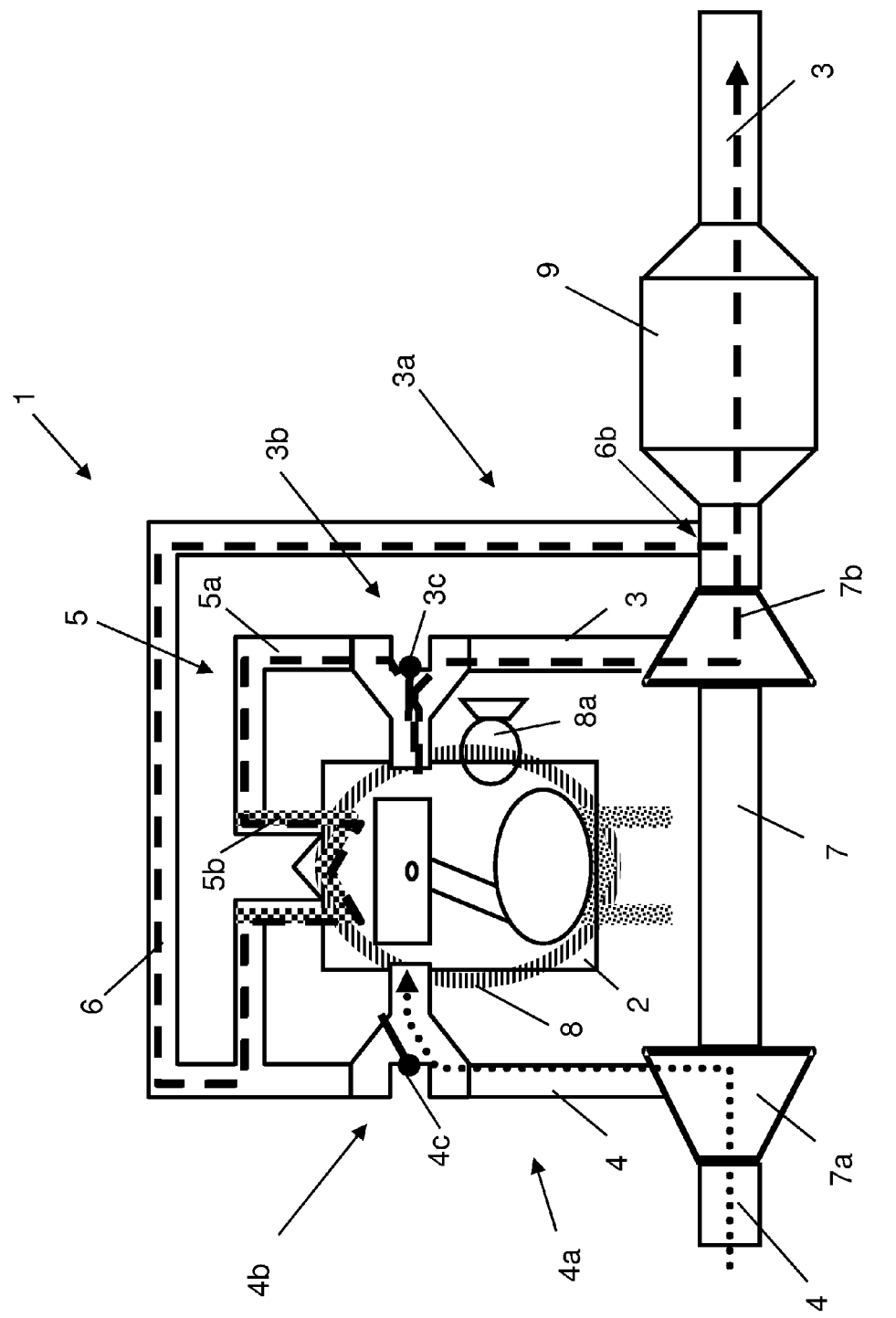
FIG. 3 schematically shows the embodiment of the internal combustion engine illustrated in FIG. 1, with the two control elements in a second switching state.

FIG. 3 schematically shows the embodiment of the internal combustion engine 1 illustrated in FIG. 1, with the two control elements 3c, 4c in a second switching state. It is sought to explain only the differences in relation to the switching state illustrated in FIG. 2, for which reason reference is otherwise made to FIG. 2. The same reference symbols have been used for the same components.

In the switching state illustrated in FIG. 3, by contrast to the switching state illustrated in FIG. 2, the first control element 3c is set such that a part of the exhaust gas is conducted through the recirculation line 5a and the remaining part of the exhaust gas is conducted through the turbine 7b (i.e., is set in the third position). The second control element 4c, which is in the first position, prevents a recirculation of exhaust gas, such that, in the present case, the recirculation line 5a together with the bypass line 6 forms a blow-off line past the turbine 7b. The blow-off of exhaust gas reduces the charge pressure on the inlet side, and thus the air mass introduced into the cylinder 2. The thermal loading of the internal combustion engine 1 likewise decreases. After a cold start, the blown-off exhaust gas may be utilized to introduce heat into the internal combustion engine 1 via the cooling device 5b, which accelerates the heating-up process of the internal combustion engine 1.

Figure 4:
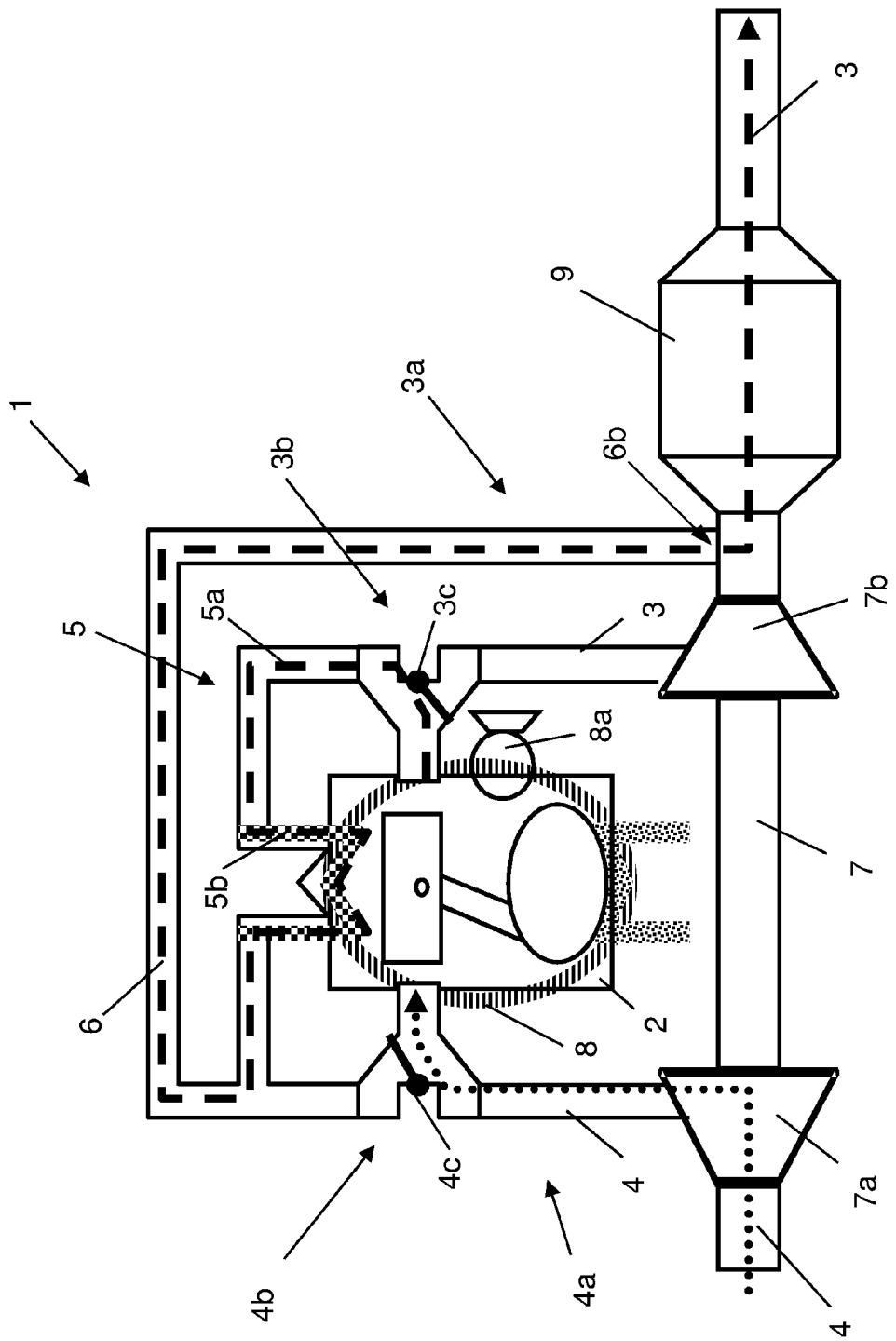
FIG. 4 schematically shows the embodiment of the internal combustion engine illustrated in FIG. 1, with the two control elements in a third switching state.

The first control element may also—as illustrated in FIG. 4—be adjusted such that no more exhaust gas is conducted through the turbine 7b, but rather all of the exhaust gas is conducted through the recirculation line 5a. FIG. 4 schematically shows the two control elements 3c, 4c in said third switching state. In said switching state, the internal combustion engine 1 operates as a naturally aspirated engine as a result of the turbine 7b having been bypassed completely.

Figure 5:
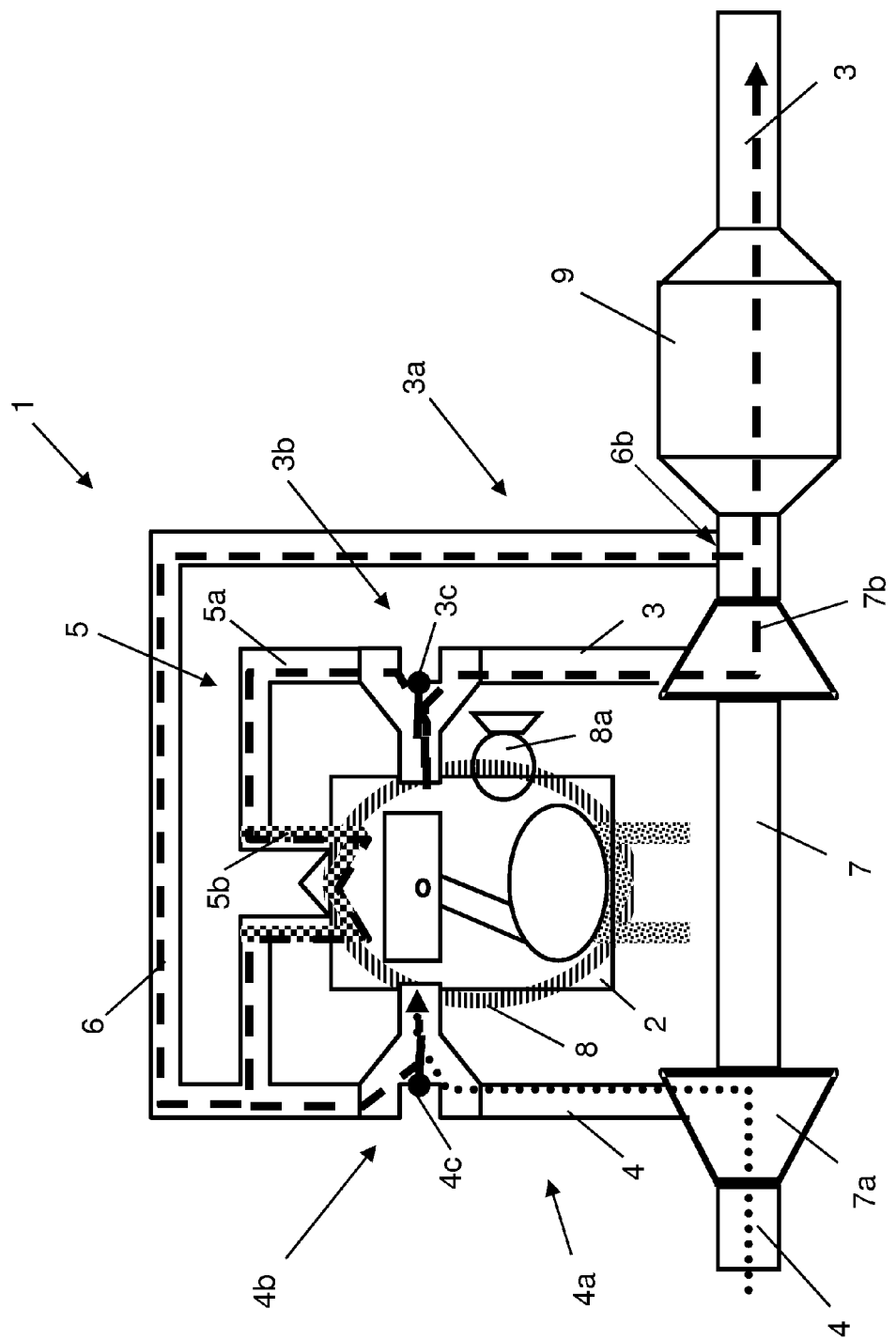
FIG. 5 schematically shows the embodiment of the internal combustion engine illustrated in FIG. 1, with the two control elements in a fourth switching state.

FIG. 5 schematically shows the embodiment of the internal combustion engine 1 illustrated in FIG. 1, with the two control elements 3c, 4c in a fourth switching state. It is sought to explain only the differences in relation to the switching states described above, for which reason reference is otherwise made to FIGS. 2 to 4. The same reference symbols have been used for the same components.

The second control element 4c is in a third position in which the intake line 4 and the bypass line 6 are connected to one another and to the cylinder 2. In said position of the second control element 4c, it is possible, through corresponding adjustment of the first control element 3c, for exhaust gas to be conducted back into the cylinder 2, such that not only fresh air but also recirculated exhaust gas is introduced into the cylinder 2.

In FIG. 5, the first control element 3c has been set such that a part of the exhaust gas is conducted through the recirculation line 5a and the remaining part of the exhaust gas is conducted through the turbine 7b. This is advantageous for reducing nitrogen oxide emissions.

Figure 6:
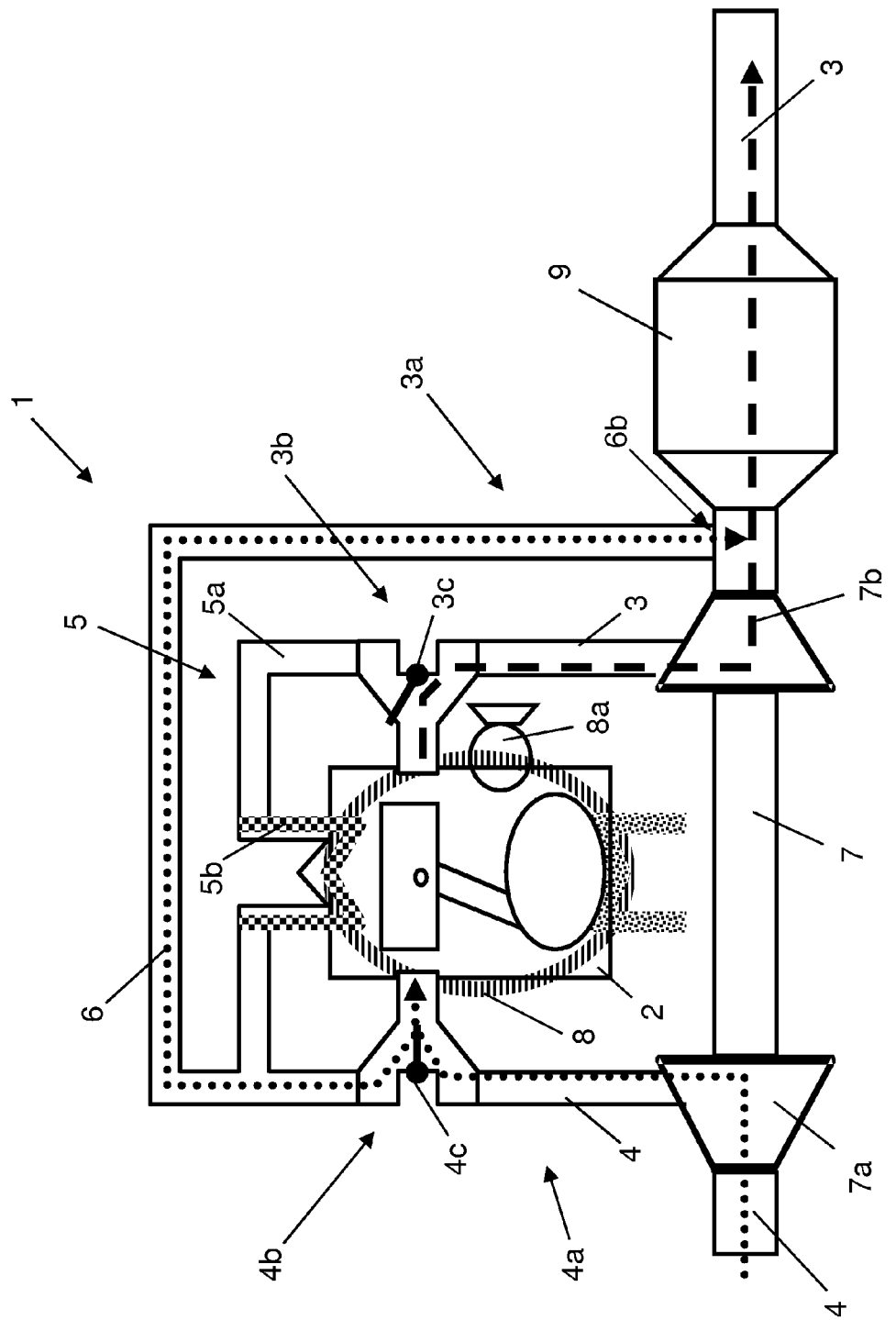
FIG. 6 schematically shows the embodiment of the internal combustion engine illustrated in FIG. 1, with the two control elements in a fifth switching state.

FIG. 6 schematically shows the internal combustion engine 1 with the two control elements 3c, 4c in a fifth switching state. It is sought to explain only the differences in relation to the switching state illustrated in FIG. 5, for which reason reference is otherwise made to FIG. 5. The same reference symbols have been used for the same components.

In FIG. 6, the first control element has been set in such a way that all of the exhaust gas is conducted through the turbine 7b and serves, at the inlet side, to generate an adequately high charge pressure. Secondary air can be injected into the exhaust-gas discharge system 3a via the bypass line 6.

Figure 7:
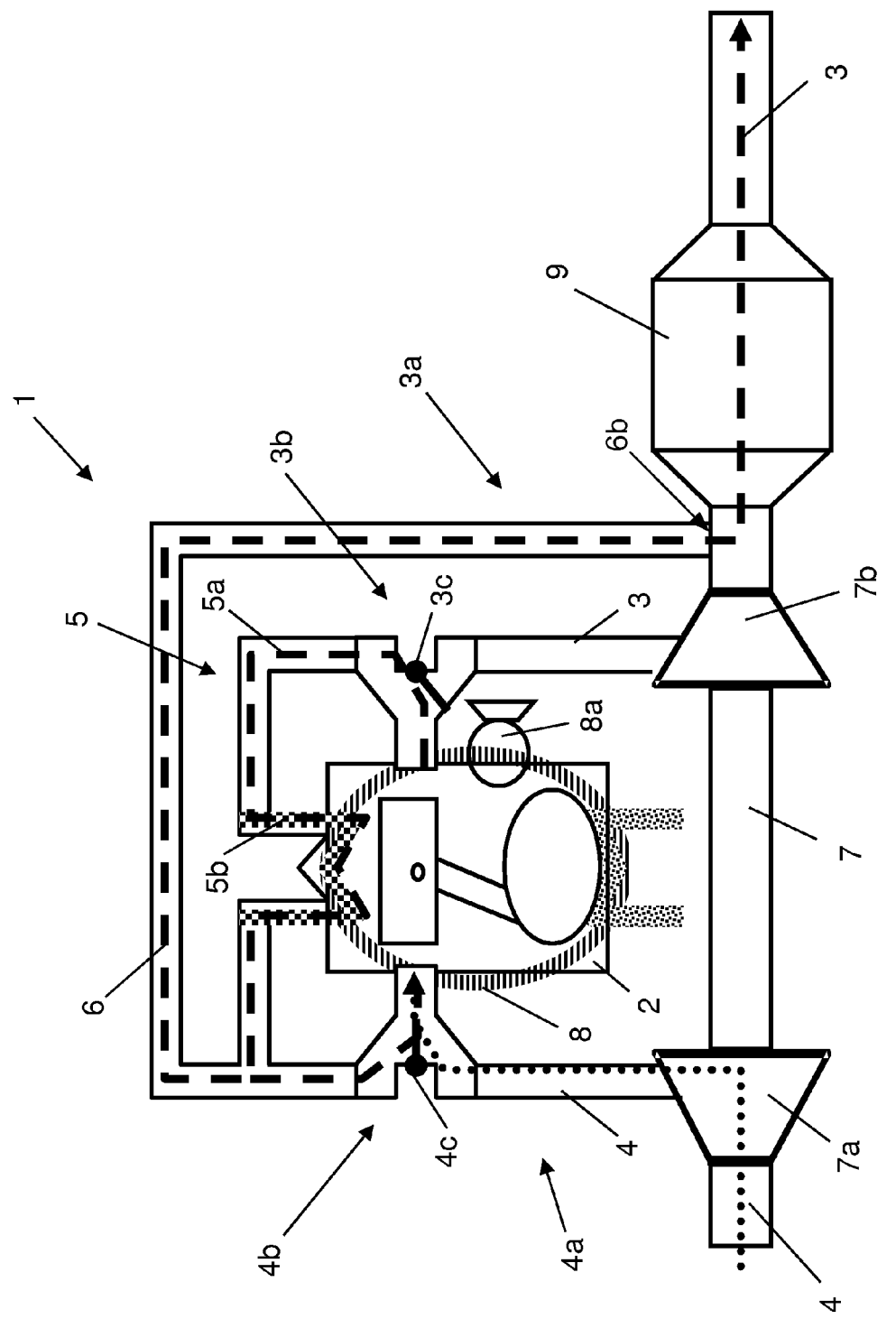
FIG. 7 schematically shows the embodiment of the internal combustion engine illustrated in FIG. 1, with the two control elements in a sixth switching state.

FIG. 7 schematically shows the embodiment of the internal combustion engine 1 illustrated in FIG. 1, with the two control elements 3c, 4c in a sixth switching state. It is sought to explain only the differences in relation to the switching state illustrated in FIG. 5, for which reason reference is otherwise made to FIG. 5. The same reference symbols have been used for the same components.

The first control element 3c has been set in such a way that all of the exhaust gas is conducted through the recirculation line 5a. In this way, the exhaust-gas back pressure is reduced, and improved efficiency in the part-load range is attained.

Figure 8:
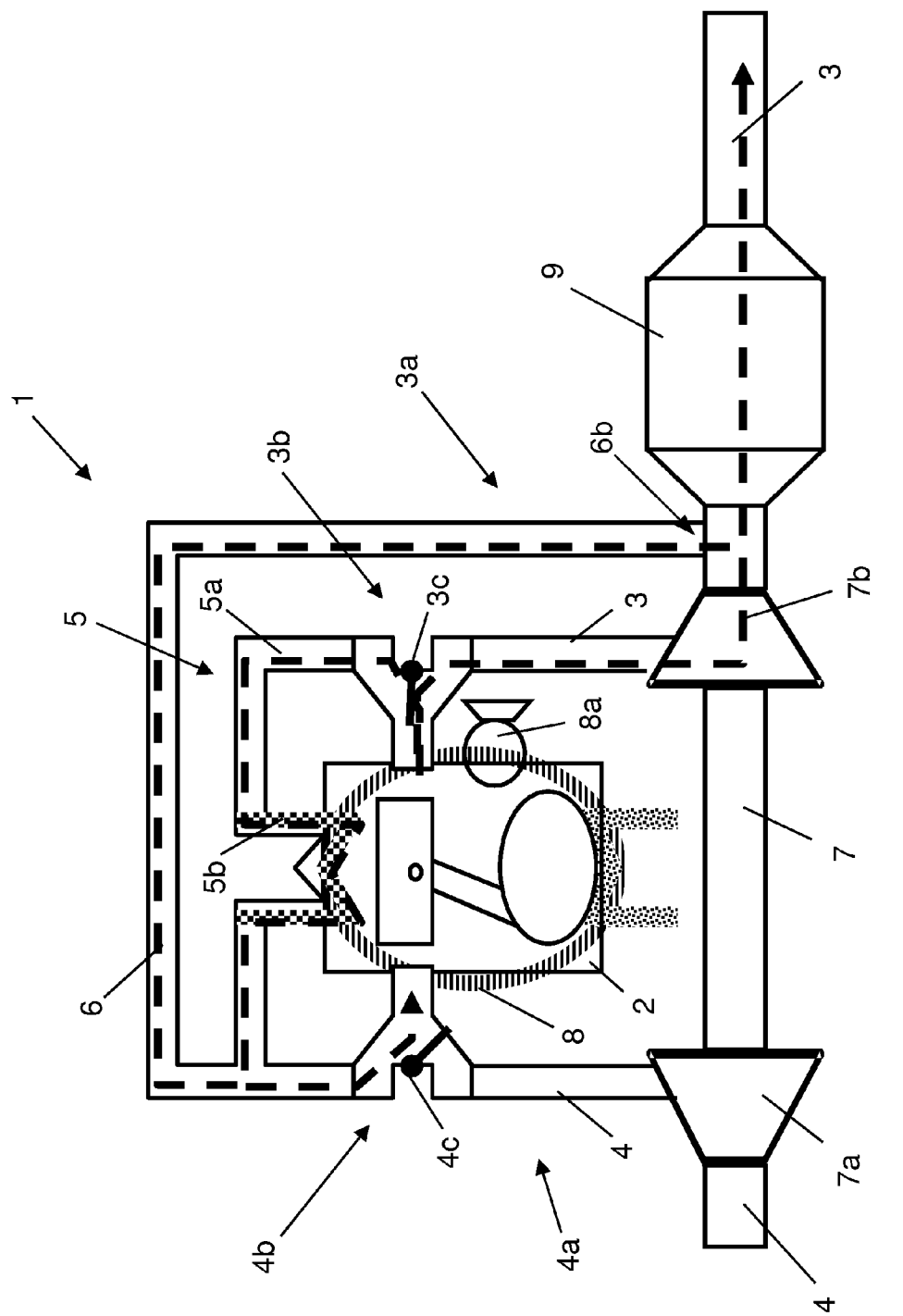
FIG. 8 schematically shows the embodiment of the internal combustion engine illustrated in FIG. 1, with the two control elements in a seventh switching state.

FIG. 8 schematically shows the embodiment of the internal combustion engine 1 illustrated in FIG. 1, with the two control elements 3c, 4c in a seventh switching state. It is sought to explain only the differences in relation to the switching states described above, for which reason reference is otherwise made to FIGS. 2 to 7. The same reference symbols have been used for the same components.

The second control element 4c is in the second position, in which the intake line 4 is separated from the cylinder 2 and the bypass line 6 is connected to the cylinder 2, such that only recirculated exhaust gas and no fresh air conducted through the compressor 7a is or can be supplied as charge air to the cylinder 2 via the intake line 4. Regardless of the position of the first control element 3c, the introduction of fresh air into the cylinder 2 is prevented, which may be expedient during overrun operation.

In the present case, the first control element 3c has been set such that a part of the exhaust gas is conducted through the recirculation line 5a, which part is supplied via the intake line 4 to the cylinder 2 or passes via the bypass line 6, bypassing the turbine 7b, into the exhaust-gas discharge system 3a. The second control element 4c, which is in the second position, serves to provide an increased pressure gradient between the exhaust-gas discharge system 3a and the intake system 4a, and therefore a high exhaust-gas recirculation rate.

Figure 9:
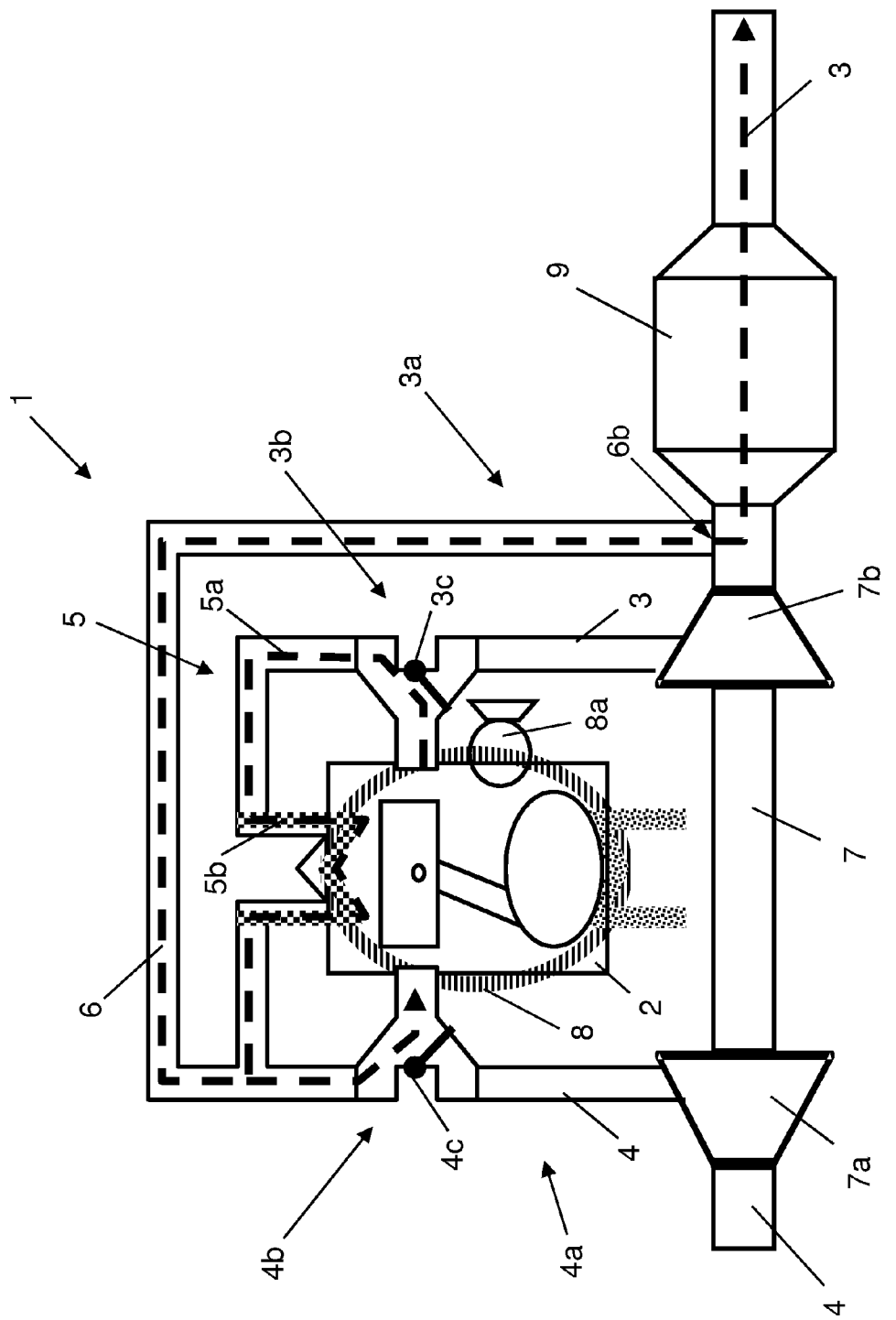
FIG. 9 schematically shows the embodiment of the internal combustion engine illustrated in FIG. 1, with the two control elements in an eighth switching state.

FIG. 9 schematically shows the embodiment of the internal combustion engine 1 illustrated in FIG. 1, with the two control elements 3c, 4c in an eighth switching state. It is sought to explain only the differences in relation to the switching state illustrated in FIG. 8, for which reason reference is otherwise made to FIG. 8. The same reference symbols have been used for the same components.

The first control element 3c has been set in such a way that all of the exhaust gas is conducted through the recirculation line 5a.

Figure 10:
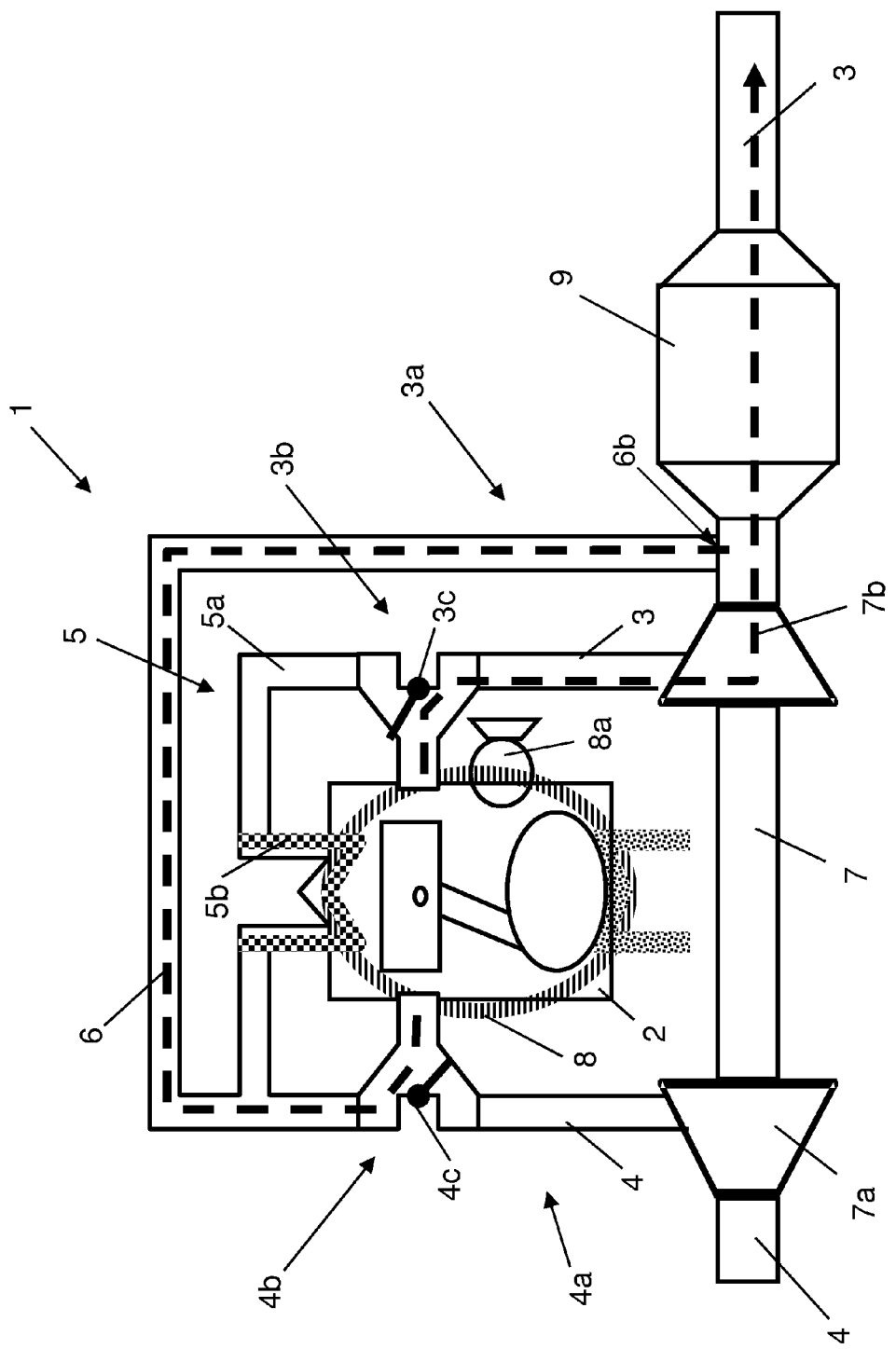
FIG. 10 schematically shows the embodiment of the internal combustion engine illustrated in FIG. 1, with the two control elements in a ninth switching state.

FIG. 10 schematically shows the embodiment of the internal combustion engine 1 illustrated in FIG. 1, with the two control elements 3c, 4c in a ninth switching state. It is sought to explain only the differences in relation to the switching state illustrated in FIG. 8, for which reason reference is otherwise made to FIG. 8. The same reference symbols have been used for the same components.

The first control element 3c has been set in such a way that all of the exhaust gas is conducted through the turbine 7b. The cylinder 2 then sucks exhaust gas in from the exhaust-gas discharge system 3a via the bypass line 6, wherein the exhaust gas has previously flowed through the turbine 7b.

What is claimed is:

1. An internal combustion engine comprising:
    at least one cylinder with an inlet side adapted to be coupled to an intake system and an outlet side adapted to be coupled to an exhaust-gas discharge system;
    at least one exhaust line for discharging exhaust gases from the cylinder to the exhaust-gas discharge system;
    at least one intake line for supplying charge air to the cylinder from the intake system;
    at least one exhaust-gas turbocharger comprising a compressor arranged in the intake system and a turbine arranged in the exhaust-gas discharge system;
    a bypass line for bypassing the cylinder, wherein the bypass line branches off from the intake system downstream of the compressor so as to form an inlet-side junction, and wherein the bypass line opens into the exhaust-gas discharge system downstream of the turbine;
    a recirculation line which branches off from the exhaust-gas discharge system upstream of the turbine so as to form an outlet-side junction which opens into the bypass line;
    a first control element at the outlet-side junction for adjusting an exhaust-gas quantity conducted through the recirculation line; and
    a second control element at the inlet-side junction having a first position that separates the bypass line from the cylinder and connects the intake line to the cylinder, and having a second position that separates the intake line from the cylinder and connects the bypass line to the cylinder.

2. The internal combustion engine of claim 1 wherein the second control element can be adjusted into a third position in which the intake line and the bypass line are connected to one another and to the cylinder.

3. The internal combustion engine of claim 1 wherein a cooling device is provided in the recirculation line in order to cool the exhaust gas.

4. The internal combustion engine of claim 3 wherein the cooling device is comprised of a liquid cooling arrangement.

5. The internal combustion engine of claim 1 further comprising an exhaust-gas aftertreatment system in the exhaust-gas discharge system downstream of the turbine.

6. A method for operating a liquid-cooled internal combustion engine, wherein the engine includes at least one cylinder with an net side coupled to an intake system for receiving fresh air and an outlet side coupled to an exhaust-gas discharge system, at least one exhaust line for discharging exhaust gases from the cylinder to the exhaust-gas discharge system, at least one intake line for supplying charge air to the cylinder from the intake system, at least one exhaust-gas turbocharger comprising a compressor arranged in the intake system and a turbine arranged in the exhaust-gas discharge system, a bypass line for bypassing the cylinder wherein the bypass line branches off from the intake system downstream of the compressor so as to form an inlet-side junction and wherein the bypass line opens into the exhaust-gas discharge system downstream of the turbine, a recirculation line which branches off from the exhaust-gas discharge system upstream of the turbine so as to form an outlet-side junction which opens into the bypass line, a first control element at the outlet-side junction for adjusting an exhaust-gas quantity conducted through the recirculation line, a second control element at the inlet-side junction having a first position that separates the bypass line from the cylinder and connects the intake line to the cylinder and having a second position that separates the intake line from the cylinder and connects the bypass line to the cylinder, and a cooling device provided in the circulation line, and wherein the method comprises the steps of:
    monitoring operating conditions of the internal combustion engine to determine desired modes of flows of fresh air and flows of exhaust gases; and
    adjusting the first control element and the second control element as a function of the desired modes, the desired modes including a first desired mode and a second desired mode and a third desired mode and a fourth desired mode and a fifth desired mode and a sixth desired mode;
    wherein the adjusting step is comprised of:
        adjusting the second control element into a first position such that only fresh air conducted through the compressor is supplied to the cylinder via the intake line in the first desired mode;
        adjusting the second control element into a third position in which the intake line and the bypass line are connected to one another and to the cylinder in the second desired mode;
        adjusting the second control element into a second position such that only recirculated exhaust gases is supplied to the cylinder via the intake line in a third desired mode; adjusting the first control element such that no exhaust gas is conducted through the recirculation line and all of the exhaust gas is conducted through the turbine in the fourth desired mode;

adjusting the first control element such that a part of the exhaust gas is conducted through the recirculation line and a remaining part of the exhaust gas is conducted through the turbine in the fifth desired mode; and adjusting the first control element such that no exhaust gas is conducted through the turbine and all of the exhaust gas is conducted through the recirculation line in the sixth desired mode.

* * * * *